(12) United States Patent
Nguyen et al.

(10) Patent No.: US 7,120,688 B1
(45) Date of Patent: Oct. 10, 2006

(54) SYSTEMS AND METHODS FOR AN INFRASTRUCTURE CENTRALIZED HEARTBEAT

(75) Inventors: Hong Thi Nguyen, Atlanta, GA (US); Michael Griffiths, Duluth, GA (US); Stephen LaPierre, Union City, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 859 days.

(21) Appl. No.: 10/232,623

(22) Filed: Sep. 3, 2002

(51) Int. Cl.
*G06F 15/173* (2006.01)

(52) U.S. Cl. .................................................. 709/224

(58) Field of Classification Search ............... 709/223, 709/224, 226, 239
See application file for complete search history.

(56) References Cited

U.S. PATENT DOCUMENTS

| | | | | |
|---|---|---|---|---|
| 5,206,901 A | * | 4/1993 | Harlow et al. | 379/211.04 |
| 5,546,574 A | | 8/1996 | Grosskopf et al. | |
| 5,579,318 A | | 11/1996 | Reuss et al. | |
| 5,701,301 A | * | 12/1997 | Weisser, Jr. | 370/428 |
| 5,838,774 A | * | 11/1998 | Weisser, Jr. | 379/92.02 |
| 5,844,978 A | | 12/1998 | Reuss et al. | |
| 6,072,857 A | * | 6/2000 | Venkateshwaran et al. | 379/9 |
| 6,804,711 B1 | * | 10/2004 | Dugan et al. | 709/223 |

* cited by examiner

*Primary Examiner*—Jason Cardone
*Assistant Examiner*—MinhChau Nguyen
(74) *Attorney, Agent, or Firm*—Withers & Keys, LLC

(57) ABSTRACT

A system for monitoring the status of a plurality of service package applications operating on a service node of a telecommunications network. A heartbeat message generating application is stored on the service node and includes a shared database that is accessible by at least two of the plurality of service package applications. A heartbeat message receiving application is stored on a service control point (SCP) that is in communication with the service node, the heartbeat message receiving application including a status database that includes records for monitoring the status of the at least two of the plurality of service package applications. The heartbeat message generating application generates a heartbeat message containing information retrieved from the shared database and sends the heartbeat message to the heartbeat message receiving application where the information is extracted and used to update the status database. Calls are routed to the service package applications based on the status stored in status database.

24 Claims, 3 Drawing Sheets

FIG. 4

| Access TN | Status Of SPA | Time to Send HB | Next Time Record Will Be Updated |
|---|---|---|---|
| 111-1111 | In Service | 14:00:00 | 14:01:30 |
| 222-2222 | Out of Service | 14:00:30 | 14:02:00 |
| nnn-nnnn | Stop Heartbeat | 14:01:00 | 14:02:30 |

| Header | Access TN | Status of SPA | Time of Next Update |
|---|---|---|---|

| Header | Access TN | Status of SPA | Time of Next Update | Access TN | Status of SPA | Time of Next Update |
|---|---|---|---|---|---|---|

70b

SYSTEMS AND METHODS FOR AN INFRASTRUCTURE CENTRALIZED HEARTBEAT

BACKGROUND

1. Field of the Invention

The present invention relates generally to telecommunication services monitoring and, more particularly to systems and methods for monitoring the availability of individual service package applications resident on a Service Node.

2. Background of the Invention

It is well-known to provide Advanced Intelligent Network (AIN)-based services that operate on a Service Node (SN). As shown in FIG. 1, a Service Node 25 is typically in communication with two Service Control Points (SCPs), SCP 15 and SCP 20, which are in communication with each other, all via an electronic network 3. Conventionally, this network is an X.25 network, but a TCP/IP network or Signaling System 7 (SS7) network has also been contemplated and implemented in certain cases. Employing a pair of SCPs provides redundancy and thus fault tolerance to network operations.

The remaining elements depicted in FIG. 1 are also well-known and include end user telephones 5a and 5b, a Service Switching Point (SSP) 10, typically a central office, and one or more Signal Transfer Points (STPs) 12a and 12b. SSP 10, STPs 12a, 12b, SCPs 15, 20 and Service Node 25 are all in potential communication with each other over electronic network 3, which, again, can be any one or combination of an X.25 network, a TCP/IP network and/or an SS7 network, as is well-known in the art.

The topology illustrated in FIG. 1 is employed by telecommunication service providers to deploy services that operate, primarily, from Service Node 25. Such services might include, for example, a voice mail system or a menu-driven information resource. In a typical service implementation, an SCP authenticates subscriber information and routes an incoming call to a particular service package application (SPA) running on a Service Node. The Service Node might be equipped, for example, with text-to-speech capabilities and/or Interactive Voice Response (IVR) capabilities. The Service Node or SPA collects information from the caller and delivers the information to the subscriber. The Service Node might also set up a connection between the caller and the subscriber, as needed. Since the Service Node plays a vital call connection role, the SCP preferably needs to know whether the Service Node and/or SPA operating thereon is in service before routing the caller to the Service Node.

In this regard, it is known to monitor the status of a Service Node with a Service Node status message, known as a "heartbeat," which is generated at the Service Node and passed to the SCP, thereby providing periodic handshaking between these two components. In prior art implementations, however, each application (i.e., SPA) running on a Service Node that works in conjunction with an SCP typically includes its own heartbeat implementation, which results in multiple implementations of a heartbeat for multiple SPAs.

Thus, for example, if there are six programs running on a given platform or Service Node, there would likely be six separate iterations of heartbeat messaging mechanisms operating over electronic network 3 between a given SCP and Service Node. Not only is it a burden to have to develop a separate heartbeat mechanism for each SPA, but operating six separate heartbeat functions adds network overhead, thereby decreasing network and equipment efficiency.

SUMMARY OF THE INVENTION

The present invention is directed to a system for monitoring the status of a plurality of service package applications operating on a service node of a telecommunications network. A heartbeat message generating application is stored on the service node and includes a shared database that is accessible by at least two of the plurality of service package applications. A heartbeat message receiving application is stored on a service control point (SCP) that is in communication with the service node, the heartbeat message receiving application including a status database that includes records for monitoring the status of the at least two of the plurality of service package applications. The heartbeat message generating application generates a heartbeat message containing information retrieved from the shared database and sends the heartbeat message to the heartbeat message receiving application where the information is extracted and used to update the status database. Calls are routed to the service package applications based on the status stored in status database.

In a preferred embodiment, the SCP maintains a shared database containing the access telephone number of each service or SPA on the Service Node and the status of each service (in or out of service) and the expected time of the next update. Every time the SCP receives a heartbeat message from the Service Node, it extracts from the message the access telephone number of the SPA on the Service Node, the heartbeat message (Stop Heartbeat/Start Heartbeat/Out of Service/In Service), and the time when the SCP should expect to receive the next heartbeat message.

A complementary portion of the heartbeat application is implemented on the Service Node. In a preferred embodiment, the Service Node maintains a shared database containing the access telephone number of each SPA on the Service Node, the status of the service heartbeat (In Service/Out of Service/Start Heartbeat/Stop Heartbeat), the time to send the heartbeat to the SCP, and the next time the particular record will get updated. Each service application on the Service Node preferably has access to the shared Service Node database to update its record. The service application can be programmed to mark its status as Out-of-Service before a planned outage or when, for example, all outgoing ports are busy.

When a timer instructs the Service Node to send a heartbeat to the SCP on behalf of a SPA, the Service Node checks the time of the next update. If it is past the current time when the Service Node is ready to send the heartbeat, the Service Node will mark the service status as "Out of Service" and will thereafter report the new service status to the SCP. A threshold can be implemented in this case before the Service Node changes the service status to ensure that the service is actually out of service. Sometimes, for example, the SPA cannot update its record on time due to a database access failure. If the Service Node determines that the record is up to date, it will proceed to send the heartbeat to the SCP. The heartbeat can be sent, for example, via one or a combination of an AIN call or a TCP/IP message via the Internet, an X.25 message via the X.25 network or a SIP message via a packet network, such as, but not limited to, an IP or ATM network.

The use of a separate SPA on a Service Node to maintain the heartbeat mechanism allows for expanded functionality such as detecting system overloads, service circuit blockage, and other related network metrics. With such network information, it is possible to temporarily suspend service to a particular Service Node preventing a catastrophic failure. Since the service-independent heartbeat mechanism may also use its own routing rules in the SS7 network, it is possible to update the heartbeat status in SCP pairs directly from the Service Node even when the service being monitored has "favored" routing to a single SCP. This feature preferably operates using well-known standard inter-SCP communication mechanisms such as an X.25 update link, thereby providing additional robustness in this area.

In addition, the present invention provides the ability to handle a mixed environment of heartbeat capable Service Nodes and non-heartbeat capable Service Nodes, as well as Service Node clusters.

Thus, the present invention provides a single, standalone application to perform the heartbeat function for a plurality of applications running on a Service Node. Such an implementation provides a consistent mechanism to implement the heartbeat function and reduces the network overhead and expense of designing new services that run on a Service Node and require heartbeat status messages. Moreover, the invention increases the efficiency of the overall heartbeat implementation on the Service Node and SCP over known heartbeat mechanisms and allows for easier implementation for new services.

The present invention also provides a uniform mechanism by which any one application or service package application (SPA) running on a Service Node can "tap" into a standard heartbeat function application, thereby precluding the need to have the SPA developer implement his/her own heartbeat mechanism. The single, standalone Service Node heartbeat application (which may be considered a SPA itself) includes a complementary heartbeat application operating at one or more SCPs in the network.

A more detailed explanation of the present invention follows with reference to the drawings.

BRIEF DESCRIPTION OF THE DRAWINGS

FIG. 4 depicts an exemplary shared database stored on a Service Node in accordance with the present invention.

FIGS. 5a and 5b depict, respectively, a single and aggregate heartbeat message that is sent from a Service Node in accordance with the present invention.

DETAILED DESCRIPTION OF THE INVENTION

Figure 1:
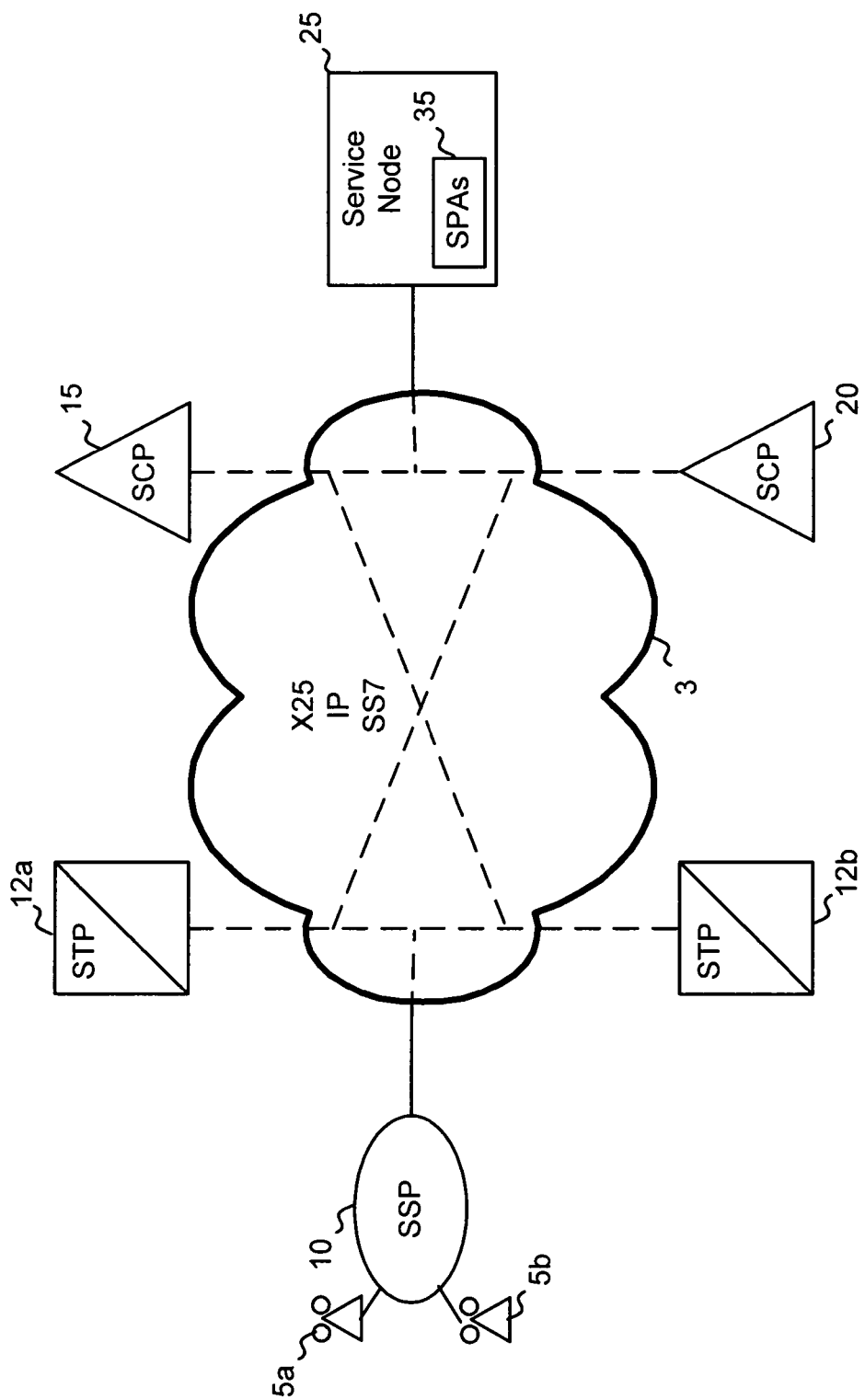
FIG. 1 depicts a standard telecommunications network over which the heartbeat function of the present invention may be implemented.
Figures 2, 3:
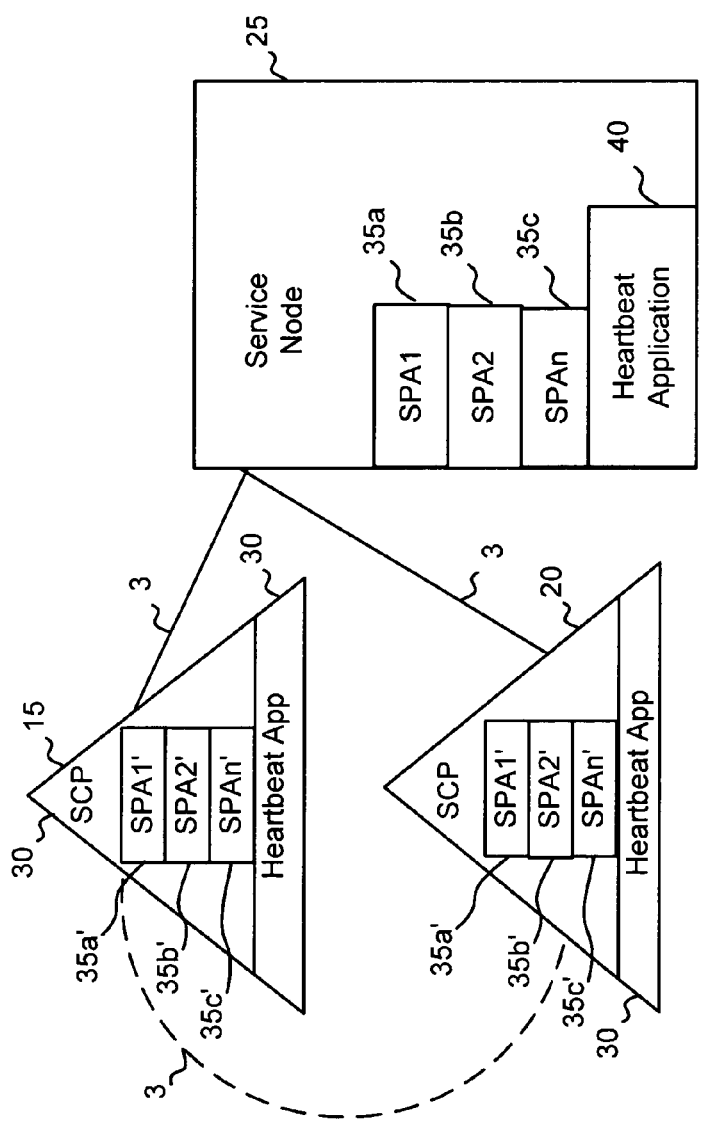
FIG. 2 depicts the locations of the heartbeat application on a Service Node and SCP in accordance with the present invention.
FIG. 3 depicts an exemplary shared database stored on an SCP in accordance with the present invention.

As shown in FIGS. 1 and 2, end user telephones 5a and 5b are connected to SSP 10, which in turn is connected to one or more STPs 12a and 12b. STPs 12a and 12b are in communication with SCP 15 and SCP 20 and these SCPs are connected to Service Node 25 on which, typically, several service package applications (SPAs) are running for the benefit of users of end user telephones 5a and 5b. So that end user telephones 5a and 5b are not connected to an SPA that is inoperable or out of service, the present invention provides an improved heartbeat mechanism by which SCPs 15 and 20 can monitor the status of the individual SPAs running on Service Node 25.

FIG. 2 illustrates a preferred implementation of the present invention. As shown, a single, preferably standardized, heartbeat application 30 (also referred to as a "heartbeat message receiving application") is located on each SCP 15 and 20. Several SPAs, SPA1, SPA2, SPAn, 35a, 35b and 35c operate in the conventional manner on the Service Node 25 (except, of course, without respective heartbeat mechanisms). Where necessary for some services, corresponding SPA logic is loaded on the SCPs. This corresponding SPA logic is identified as SPA1', SPA2', SPAn', 35a', 35b' and 35c'. A Service Node heartbeat application 40 (also referred to as a "heartbeat message generating application") operates on Service Node 25 and complements/communicates with SCP heartbeat application 30. In a preferred embodiment, Service Node heartbeat message generating application 40 is employed by each SPA running on Service Node 25 for which a heartbeat mechanism is desired.

Referring now to FIG. 3, each SCP preferably maintains a database 50 (also referred to as a "status database") comprising the access telephone number of each SPA on Service Node 25 and the status of each of the SPAs (Out of Service/In Service/Stop Heartbeat/Start Heartbeat) and the time of the next update. Every time SCP heartbeat application 30 receives a heartbeat message (described below) from Service Node heartbeat application 40, it extracts from the message the access telephone number of the SPA on Service Node 25, a heartbeat message (Out of Service/In Service/ Stop Heartbeat/Start Heartbeat) (described below), and the time when SCP heartbeat application 30 should expect to receive the next heartbeat message.

Service Node heartbeat application 40 also maintains a database that is shared by the SPAs resident on Service Node 25. Specifically, as shown in FIG. 4, database 60 contains the access telephone number of each SPA on the Service Node for which a heartbeat mechanism is desired, the status of the SPA (Out of Service/In Service/Start Heartbeat/Stop Heartbeat), the time to send the heartbeat to the SCP, and the next time the record is to be updated. For example, a given SPA resident on Service Node 25 preferably has access to database 60 to update its record. The SPA can mark its status as Out-of-Service before a planned outage or when, for example, all outgoing ports are busy.

In a preferred embodiment of the invention, when a timer instructs Service Node heartbeat application 40 to send a heartbeat message to SCP heartbeat application 30 on behalf of an SPA, Service Node heartbeat application 30 checks database 60 for the time of the expected next update. If the time of the expected next update is past the current time when Service Node heartbeat application 40 is ready to send the heartbeat message, Service Node heartbeat application 40 preferably marks the status of that SPA in database 60 as "Out of Service." This status is then reported to SCP heartbeat application 30 via a heartbeat message. In other words, if the data for a particular SPA in database 60 is "stale" then that SPA is deemed to be out of service.

In an aspect of the present invention, a threshold can be required to be exceeded before Service Node heartbeat application 40 finally changes the service status to "Out of Service" to ensure that the SPA is truly out of service. For example, it is possible that the SPA cannot update its record on time due to a database access failure, but the SPA is otherwise operating normally. Thus, Service Node heartbeat application 40 might require that a status of "Out of Service"

will be set only after, for example, three iterations of checking the last update time.

If Service Node heartbeat application 40 determines that the record is up to date, it will proceed to send the appropriate heartbeat message to SCP heartbeat application 30. The heartbeat message itself can be sent via one or a combination of an AIN call or a TCP/IP message via the Internet or a SIP message via the X.25 packet network.

Two types of heartbeat messages are shown in FIG. 5. In one case, heartbeat message 70a is a heartbeat message that contains information about the status of a single SPA that is identified by its access telephone number. In the other case, heartbeat message 70b is an aggregate heartbeat message that comprises information about the status of a plurality of SPAs at the same time. In either case, as explained above, SCP heartbeat application 30 extracts the status information and expected time of the next update for each SPA.

The present invention preferably supports at least four status types: In Service, Out of Service, Stop Heartbeat, Start Heartbeat. If the status is In Service, SCP 15 or 20 routes calls to Service Node 25 in the conventional manner. If the status is Out of Service, SCP 15 or 20 causes calls not to be routed to the SPA that is out of service, and will either route the calls to a backup SPA or not route the calls at all. The Stop Heartbeat status is used when it might be desirable to avoid the network overhead of heartbeat messages, especially when there is confidence that a particular SPA is operating as expected. The Start Heartbeat status is used to restart the handshaking process between SCP 15 or 20 and Service Node 25. Typically, this status will quickly change to In Service, i.e., after receipt of the first Start Heartbeat status message.

The status of a particular SPA can preferably also be changed by SCP heartbeat application 30 in the case where a heartbeat message is not received by the expected next update time, shown in FIG. 3. In such a case, SCP heartbeat application 30 will of the given SPA to out of service. Thresholds may also be implemented on the SCP side, as in the case of Service Node heartbeat application 40, to avoid inadvertent erroneous status changes.

The use of a separate, preferably standardized, heartbeat application (which preferably is itself another SPA resident on Service Node 25) allows for expanded functionality such as detecting system overloads, service circuit blockage, etc. Once such an event is detected, it is then possible to temporarily suspend service to a particular Service Node preventing a catastrophic failure.

The service independent heartbeat mechanism described herein preferably uses its own routing rules in the SS7 network. Accordingly, it is possible to update the SPA statuses in SCP pairs directly from a Service Node even when a given SPA being monitored has "favored" routing to a single SCP. This feature preferably operates in conjunction with well-known, standard inter-SCP communication mechanism such as an X.25 update link, thereby providing additional robustness.

Further, the present invention provides the ability to handle a mixed environment of heartbeat capable Service Nodes and non-heartbeat capable Service Nodes. Where no heartbeat is desired, the SCP simply does not include the corresponding access telephone number in its shared database.

The present invention also introduces a system by which a heartbeat mechanism can operate effectively from within a cluster of compact Service Nodes. In known systems, if a single heartbeat message from within a cluster is sent carrying an Out of Service message, the entire cluster might be regarded as out of service when, in fact, the cause of the Out of Service message is due only to a failure of one component in the cluster. In accordance with the present invention, however, it is now possible to selectively identify specific elements within a cluster by, for example, not only using an access telephone number for service identification purposes, but also using an additional equipment identifier, e.g., an IP address (in the case of a TCP/IP network).

Another advantage of the present invention is that it is possible to incorporate new protocols into the heartbeat mechanism without having to rewrite code for each SPA.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for monitoring the status of a plurality of service package applications operating on a service node of a telecommunications network, the system comprising:
   a heartbeat message generating application stored on the service node, the heartbeat message generating application including a shared database that is accessible by at least two of the plurality of service package applications; and
   a heartbeat message receiving application stored on a service control point (SCP) that is in communication with the service node, the heartbeat message receiving application including a status database that includes records for monitoring the status of the at least two of the plurality of service package applications,
   wherein the heartbeat message generating application generates a heartbeat message containing information retrieved from the shared database and sends the heartbeat message to the heartbeat message receiving application where the information is extracted and used to update the status database.

2. The system of claim 1, wherein the heartbeat message receiving application and heartbeat message generating application are in communication with each other using at least one of X.25, TCP/IP and SS7.

3. The system of claim 1, further comprising another SCP that is used for redundancy.

4. The system of claim 1, wherein the heartbeat message comprises information related to a single service package application.

5. The system of claim 1, wherein the heartbeat message comprises information related to a plurality of service package applications.

6. The system of claim 1, wherein a record in the shared database comprises fields for an access telephone number, the status of the service package application associated with that access telephone number, a time to send the heartbeat message and the next time the record is to be updated.

7. The system of claim 1, wherein the status database comprises fields for an access telephone number, the status of the service package application associated with that access telephone number, and the next time the record is to be updated.

8. The system of claim 1, wherein the information retrieved from the shared database includes a status message selected from: In Service, Out of Service, Stop Heartbeat and Start Heartbeat.

9. A method of monitoring a service node in an electronic telecommunications network, the method comprising the steps of:
- providing a service node having a plurality of service package applications running thereon, the service node also having a single heartbeat message generating application that is accessible by each of the service package applications;
- generating a heartbeat message with the heartbeat message generating application, the heartbeat message comprising identification data that identifies at least one of the service package applications and indicates a status of the at least one service package application;
- sending the heartbeat message to a service control point (SCP) in the telecommunications network and updating a database stored on the SCP, the database stored on the SCP including a status field for the status of the at least one service package application; and
- routing a call to the service node when the status field in the database stored on the SCP indicates that the at least one service package application is available to receive the call.

10. The method of claim 9, wherein the heartbeat message generator is itself a service package application.

11. The method of claim 9, wherein the identification data is an access telephone number.

12. The method of claim 9, further comprising sending a separate heartbeat message for each of the plurality of service package applications.

13. The method of claim 9, further comprising sending a single heartbeat message that aggregates respective statuses of the plurality of service package applications.

14. The method of claim 9, further comprising modifying a status field in a database based on the heartbeat message.

15. The method of claim 9, further comprising modifying a status field in a database if a predetermined time has passed.

16. A method of monitoring the status of a service package application operating on a service node, comprising the steps of:
- storing status information related to at least two different service package applications in a single database;
- generating a message including data based at least in part on the status information stored in the single database;
- sending the message to a control point;
- receiving the message at the control point and extracting the data from the message; and
- controlling access to a service package application based on the data received.

17. The method of claim 16, wherein the single database is stored on service node of a telecommunications network.

18. The method of claim 16, wherein the control point is a service control point of a telecommunications network.

19. The method of claim 16, wherein the message comprises an access telephone number.

20. The method of claim 16, further comprising sending the message including data related to only one of the at least two different service package applications.

21. The method of claim 16, further comprising sending the message including data related to both of the at least two different service package applications.

22. The method of claim 16, further comprising detecting system overloads and service circuit blockage based at least in part on the data in the message.

23. The method of claim 16, further comprising modifying a status field in a database based on the message.

24. The method of claim 16, further comprising modifying a status field in a database if a predetermined time has passed.

* * * * *